July 12, 1938.   W. LA HODNY ET AL   2,123,431
MIRROR
Filed Jan. 26, 1935   3 Sheets-Sheet 1
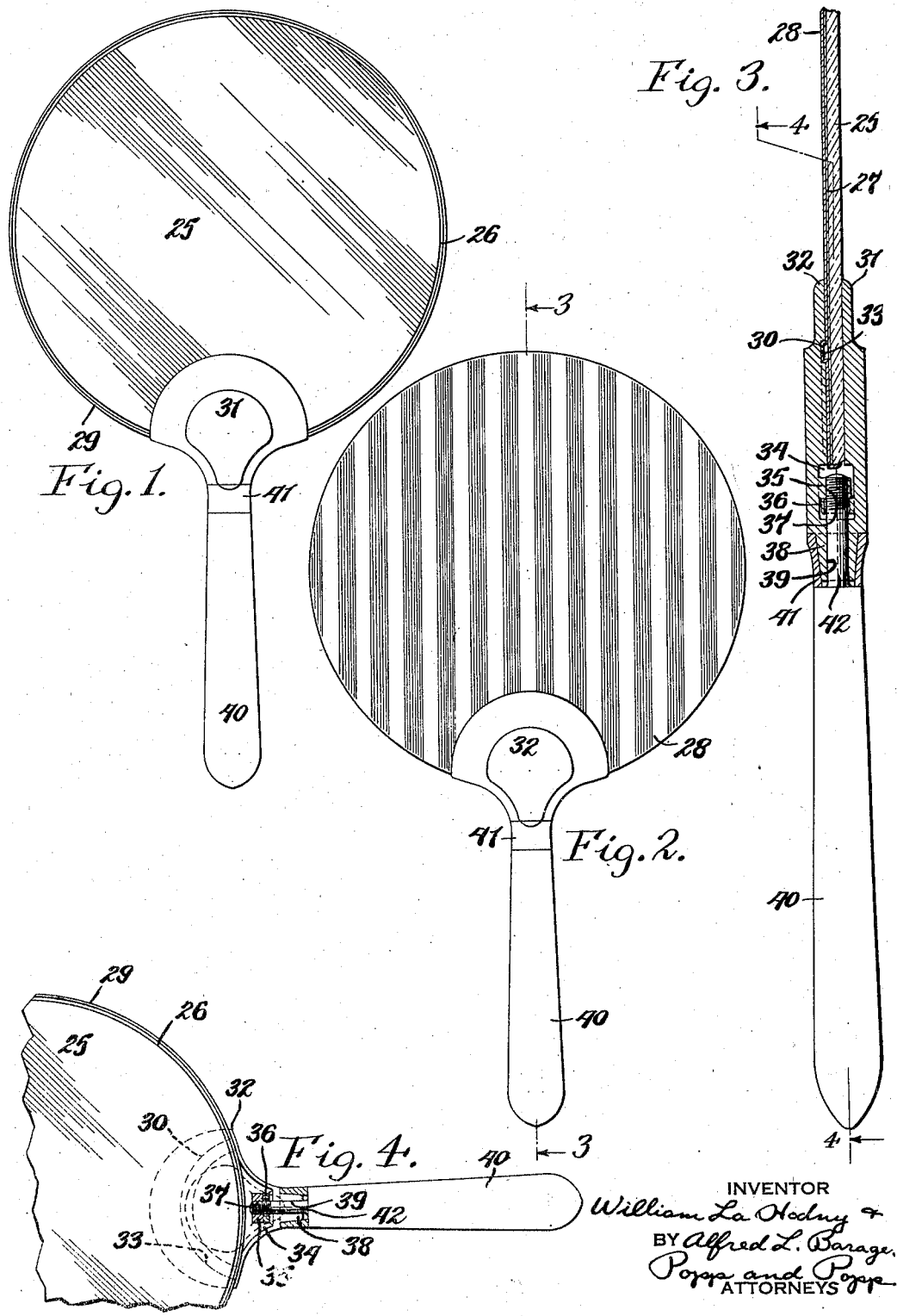

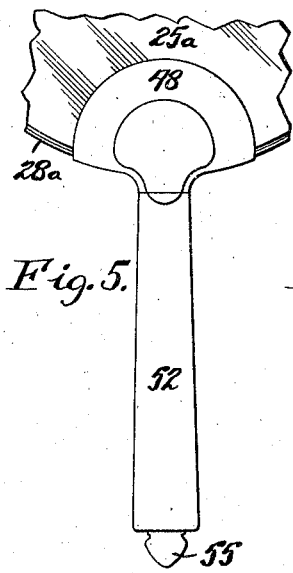
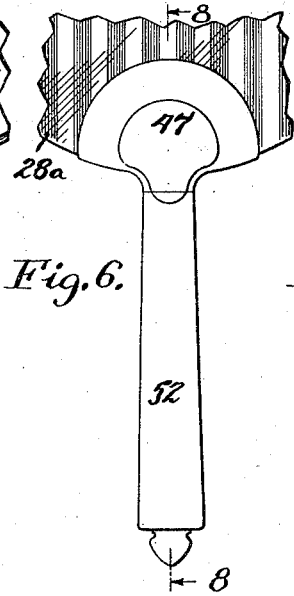
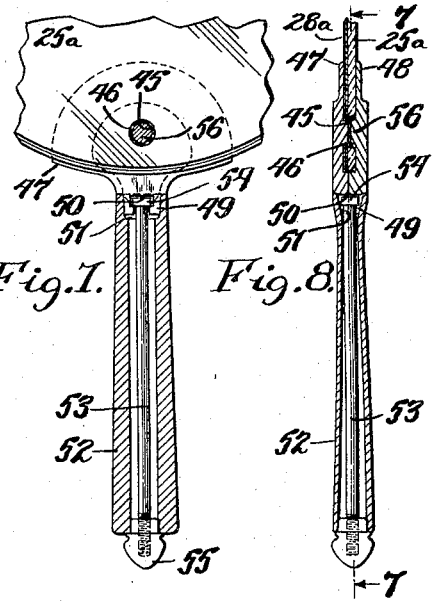
Fig. 5. Fig. 6. Fig. 7. Fig. 8.
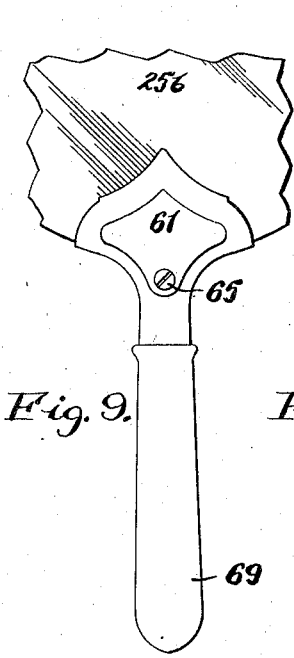
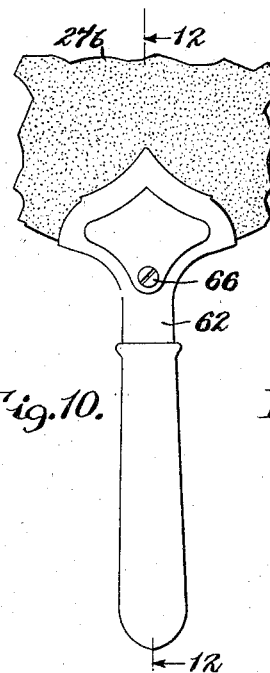
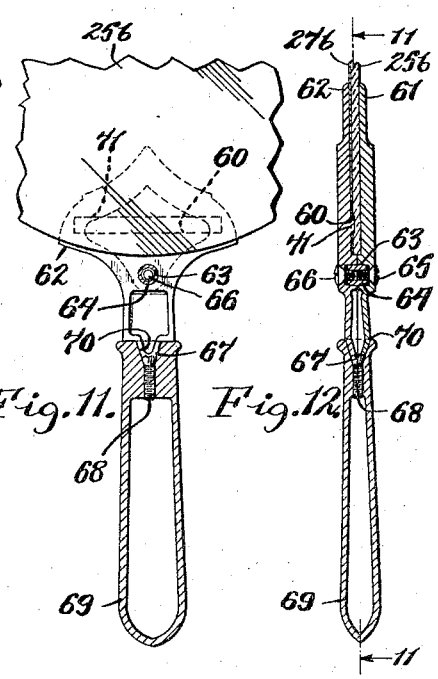
Fig. 9. Fig. 10. Fig. 11. Fig. 12.

July 12, 1938.                W. LA HODNY ET AL                2,123,431
                                  MIRROR
                          Filed Jan. 26, 1935           3 Sheets-Sheet 3

INVENTOR
William La Hodny &
BY Alfred L. Barager
Popp and Popp
ATTORNEYS

Patented July 12, 1938

2,123,431

UNITED STATES PATENT OFFICE 2,123,431

MIRROR

William LaHodny and Alfred T. Barager, Buffalo, N. Y., assignors to Standard Mirror Company, Inc., Buffalo, N. Y., a corporation of New York Application January 26, 1935, Serial No. 3,658

8 Claims. (Cl. 88—102)

This invention relates to a mirror and support therefor, such as a handle and in particular to a hand mirror which is substantially or entirely frameless so that the entire obverse face is reflective and the hand mirror is larger, in effect, than the usual hand mirror of the same size.

In providing such a full face mirror it is essential to provide entirely different means for connecting the handle to the mirror proper. In accordance with the present invention the mirror panel is clamped between two parts which form part of a handle, these parts embracing both the obverse and reverse sides of the mirror panel and the handle also being formed to provide concealed clamping means for drawing the clamping members together. In addition, positive means are provided for preventing the mirror proper from slipping out from the clamping pieces, it having been found impossible to secure a reliable connection by the provision of frictional clamping members alone.

A further object of the invention is to provide a hand mirror having a bright metal back and a bright metal handle in keeping with the current tendency of design although the handle and also the backing can be made of other materials, such as phenol formaldehyde condensation products and the mirror panel can also be unbacked.

Another aim of the present invention is to provide such a hand mirror, which is extremely inexpensive to form and assemble and can be produced at very low cost and at the same time is very attractive in appearance and will fit in with other dressing table accessories.

In the accompanying drawings:

Fig. 1 is a front elevation of a hand mirror embodying one form of our invention.

Fig. 2 is a rear elevation thereof.

Fig. 3 is a vertical longitudinal section, taken on line 3—3, Fig. 2.

Fig. 4 is a longitudinal section, taken on line 4—4, Fig. 3.

Fig. 5 is a fragmentary front elevation, similar to Fig. 1 showing a modified form of our invention.

Fig. 6 is a fragmentary reverse elevation of the form of the invention shown in Fig. 5.

Fig. 7 is a fragmentary longitudinal section, taken on line 7—7, Fig. 8.

Fig. 8 is a fragmentary vertical section, taken on line 8—8, Fig. 6.

Fig. 9 is a fragmentary front elevation, similar to Figs. 1 and 5 and showing a further modified form of our invention.

Fig. 10 is a rear elevation of the form of the invention shown in Fig. 9.

Fig. 11 is a fragmentary longitudinal section, taken on line 11—11, Fig. 12.

Fig. 12 is a fragmentary longitudinal section, taken on line 12—12, Fig. 10.

Figure 13:
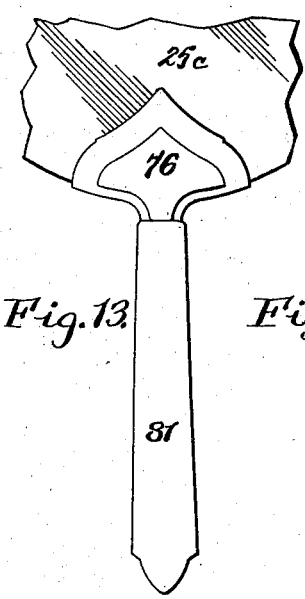
Fig. 13 is a fragmentary front elevation similar to Figs. 1, 5 and 9 and showing a still further modified form of our invention.

In its general organization the invention comprises a glass mirror plate of any suitable form which is preferably backed by a sheet metal backing plate, the edges of which are turned around the rim of the glass plate so as to leave the field of the mirror plate substantially unobstructed. The panel so formed is gripped at one side between a pair of clamping members to which a handle is secured and clamping means are provided which extend lengthwise of the handle and are turnable to draw the clamping members into firm engagement with the obverse and reverse sides of the mirror panel so as to firmly clamp the handle to the mirror. These clamping means can comprise the handle itself or can comprise a screw extending lengthwise through the center of the handle and terminating in a head which is turned.

In the form of the invention shown in Figs. 1–4 the mirror panel is shown as comprising a plate of circular plate glass 25 having a bevelled edge 26 and having its back silvered, as indicated at 27, although it will be understood that various other reflective coatings can be applied instead of silver. This mirror plate is provided with a metal back 28 which conforms to the shape of the mirror and has its edge 29 turned around the edge of the mirror plate and engaging the bevel 26 so that the metal back completely encloses the rear side of the mirror and embraces the bevel all around its periphery. The metal backing may be of any form and finish but a pleasing finish is achieved by making the back of chromium plated metal and suitably dulling a part of the back to provide any desired design.

In accordance with the form of the invention shown in Figs. 1-4, before the metal backing 28 is applied to the mirror a semi-circular rib or bead 30 is pressed outwardly from the metal backing plate at one side, this bead extending inwardly from one side of the mirror, as indicated by dotted lines in Fig. 4, and being subsequently employed to anchor the clamping sections of the handle as hereinafter described.

These clamping sections consist of two sections 31 and 32 which can be die cast and made of any suitable material. These sections can be of any suitable configuration and as shown are fan-shaped so as to provide a broad grip on the mirror panel both transversely of the handle and also longitudinally thereof and at the same time interfere with the field of the mirror panel to the least extent. The inner face of the clamping section 32 is provided with a semi-circular recess 33 receiving the bead 30 of the metal backing plate 28 so as to positively prevent the mirror panel from being pulled endwise from between the two clamping sections 31 and 32. It has been found impossible to reliably hold the mirror panel between two clamping parts, as illustrated, without the provision of a positive anchor between the metal backing plate and at least one of the clamping sections inasmuch as a reliable friction grip cannot be obtained even with special facings.

The clamping sections are jointly formed to provide an internal chamber 34 and the clamping section 32 is provided with a lug 35 extending into this chamber and adapted to bear on the upper face of a corresponding lug 36 of the clamping section 31. These lugs 35 and 36 are provided with registering holes and the hole through the lug 35 is threaded, as indicated at 37, whereas the hole through the lower lug 36 is unthreaded. The clamping sections 31 and 32 are also jointly formed to provide a tapered extension 38 of frusto-conical form and having a hole 39 extending therethrough in line with the holes through the lugs 35 and 36. The handle 40 can be of any suitable form and is provided with an integral ferrule 41 having a tapering hole fitting the tapered extension 38 of the two clamping sections 31 and 32 and the handle is also formed to provide a threaded extension 42 which extends into the chamber 34 and engages the threads 37 of the lug 35. When the parts are assembled as described it is apparent that upon turning the handle 40 the two clamping sections 31 and 32 and the handle 40 are drawn together inasmuch as the lug 35 has threaded engagement with the handle 40 and bears upon the lug 36. As the handle 40 and clamping sections 31 and 32 are drawn together the tapered extension 38 is drawn into the ferrule 41 until tightly wedged therein, the wedging action between the tapered extension and the ferrule drawing the two clamping sections together and clamping the mirror panel between these two clamping sections. This clamping of the two clamping sections 31 and 32 against the reverse and obverse sides of the mirror panel in addition to the positive anchorage provided by the interfitting of the bead 30 and groove 33 reliably holds the mirror panel and handle together.

In the form of the invention shown in Figs. 5-8 the mirror plate 25a is provided with a metal backing 28a, as in the preferred form and at one side a hole 45 is provided in the mirror panel so formed and in this hole is disposed a rubber tube or sleeve 46. The mirror panel is clamped between two clamping sections 47 and 48 which are shown as being of the same general form as the clamping sections shown in Figs. 1-4 and the clamping sections are jointly formed to provide a wedge-shaped extension 49 having a T-slot 50 extending transversely therethrough. This wedge-shaped extension 49 fits into a tapering opening or recess 51 provided in the end of a tubular handle 52 and a bolt 53 extends through the handle 52 and has its head 54 disposed in the T-shaped slot 50. The other end of the bolt 53 is threaded and a nut 55 is secured to the bolt 53 and bears against the outer end of the handle 52 so that upon tightening the nut 55 the wedge-shaped extension 49 of the clamping sections 47 and 48 is drawn into the tapering opening 51 so that the clamping sections 47 and 48 are drawn toward one another to clamp the mirror panel securely therebetween.

In order to provide a positive interlock between one of the clamping sections 47 and 48 and the mirror panel assembly one of the sections, 48, is provided with a teat or button 56 which fits into the hole 45 in the mirror panel assembly and presses tightly against the rubber bushing 46 therein so as to secure a firm and positive interlock.

In the form of the invention shown in Figs. 9-12 the mirror plate 25b is provided with a reflective coating 27b but is unprovided with a metal backing, such as is shown in the forms of the invention shown in Figs. 1-8. The glass panel 25b is provided at one side with a straight slot 60 and is clamped between two clamping members or jaws 61 and 62 which can be of any suitable shape but are shown as being spade-shaped so as to adequately grip the mirror panel and at the same time interfere with the field of vision to the least extent. The clamping sections 61 and 62 are jointly formed to provide an internal chamber 63 which receives an internally threaded bushing 64. Screws 65 and 66 screw into this bushing 64 from opposite sides of the clamping sections 61 and 62 so that upon tightening the screws 65 and 66 the two clamping sections 61 and 62 are drawn firmly together so as to clamp the mirror assembly therebetween. The outer ends of the two clamping sections 61 and 62 are jointly formed to provide a tapering portion 67 which terminates in a threaded stem 68. The handle 69 can be of any suitable form and is provided at its inner end with a tapering recess 70 and is threaded to receive the stem 68. Upon turning the handle its tapering recess 70 is tightened against the tapered portion 67 of the two clamping sections 61 and 62 so as to be securely held in position.

In order to provide a positive interlock between the mirror panel assembly and one of the clamping sections, the clamping section 62 is formed to provide a straight transverse ridge 71 on its inner face which fits into the straight groove 60 in the mirror panel 25b and prevents the mirror panel from being pulled endwise from between the clamping sections.

Figure 14:
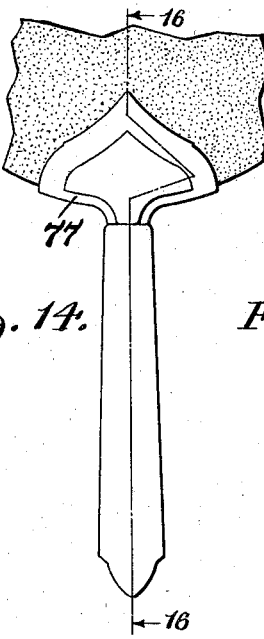
Fig. 14 is a fragmentary rear elevation of the form of the invention shown in Fig. 13.
Figure 15:
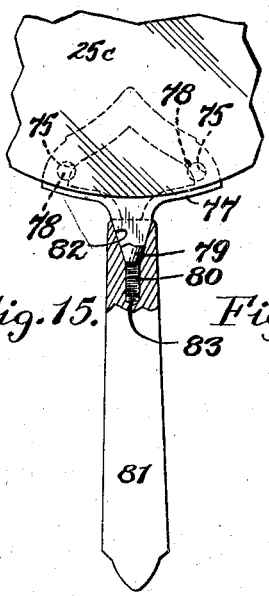
Fig. 15 is a fragmentary longitudinal section taken on line 15—15, Fig. 16.
Figure 16:
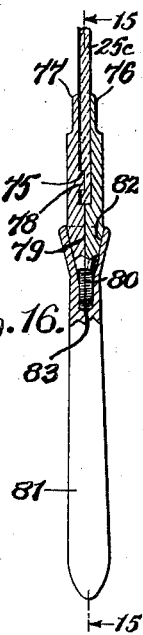
Fig. 16 is a fragmentary longitudinal section taken on line 16—16, Fig. 14.

In the form of the invention shown in Figs. 13-16, the mirror panel 25c is unprovided with a metal backing, such as is shown in the forms of the invention illustrated in Figs. 1-8 and is provided with two recesses 75 at one side. This mirror panel is clamped between two clamping members or jaws 76 and 77, the jaw 77 being formed with two teats 78 which fit into the recesses 75 of the mirror plate so as to positively hold the mirror plate against endwise displacement from between the two clamping jaws. The clamping jaws are generally of the same shape as the jaws shown in Figs. 9-12 and are jointly formed to provide a tapering extension 79 terminating in a threaded stem 80. The handle 81 is shown as being solid and at its inner end is provided with a tapering recess 82 and an internally threaded opening 83. The handle is adapted to be screwed onto the threaded stem 80 and its tapering opening 82 fits the tapering extension 79 so that upon tightening the handle the two clamping sections 76 and 77 are drawn together to firmly clamp the mirror panel assembly therebetween.

Figure 17:
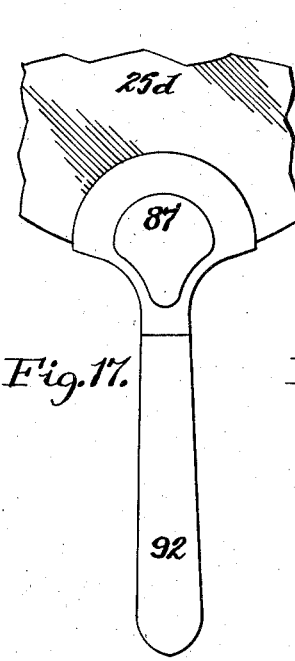
Fig. 17 is a fragmentary front elevation, similar to Figs. 1, 5, 9 and 13 and showing another modification of our invention.
Figure 18:
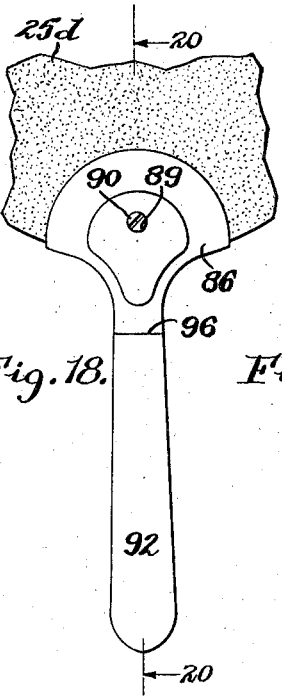
Fig. 18 is a rear elevation of the form of the invention shown in Fig. 17.
Figure 19:
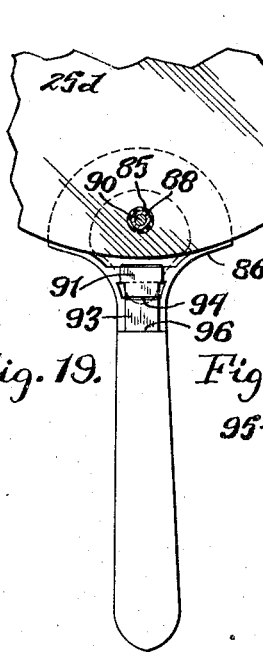
Fig. 19 is a fragmentary longitudinal section, taken on line 19—19, Fig. 20.
Figure 20:
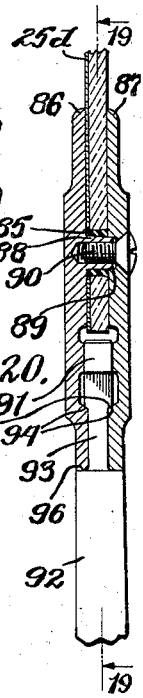
Fig. 20 is a fragmentary longitudinal section, taken on line 20—20, Fig. 18.

In the form of the invention shown in Figs. 17-20 the mirror plate 25d is unprovided with a metal backing and on one side is provided with a hole 85 extending therethrough. The opposite sides of the mirror plate are gripped between two clamping members 86 and 87 around this hole and one of the clamping members, 86, is provided with an internally threaded boss 88 which registers with a hole 89 provided in the other section. A screw 90 extends through the hole 89 and screws into the boss 88 so as to clamp the two parts together. The clamping sections 86 and 87 also clamp a head 91 of a handle 92, this head being carried at the end of a flat neck 93. The head 91 is enlarged and is formed to provide a downwardly facing shoulder 94 which engages corresponding shoulders 95 of the two clamping sections 86 and 87. The outer ends of the clamping sections 86 and 87 bear against the shoulder 96 provided between the flat necked stem 93 and the handle portion 92 and it is therefore apparent that the head 91 and shoulder 96 prevent the handle 92 from being withdrawn from between the two clamping sections 86 and 87.

From the foregoing it is apparent that all the forms of the present invention provide a substantially rimless hand mirror in which substantially the full area of the mirror plate is useful. This, of course, renders the mirror far more effective than hand mirrors having a rim which blanks off the edge of the mirror. Furthermore, the hand mirror shown is extremely attractive in appearance and by the combination of a positive lock and clamping means a firm and reliable connection is provided between the mirror proper and the handle. It is also apparent that the invention provides a hand mirror which can be produced at very low cost.

We claim as our invention:

1. A hand vanity mirror comprising a relatively heavy glass mirror panel of substantial dimensions, the opposite flat faces of which are parallel, a rigid handle for supporting said panel and having a tapered recess, a clamping member embracing a small portion of the edge and a small portion of the adjacent flat face of said panel, a second clamping member adapted to engage a small portion of the reverse face of said panel, said clamping members being jointly formed to provide a tapered extension fitting into said tapered recess, and straight, threaded screw means extending coaxially of said handle for drawing said extension into said recess to thereby clamp said clamping members against the opposite flat faces of said panel.

2. A mirror, comprising a mirror panel, a support therefor having a tapered recess at one end, a pair of clamping members embracing a small portion of the edge and adjacent portions of the opposite flat faces of said panel and jointly formed to provide a tapered extension fitting into said recess and screw means connected to said support and extending coaxially into said extension and operatively connected to at least one of said clamping members to draw said tapered extension into said tapered recess upon being turned.

3. A mirror, comprising a mirror panel, a support therefor having a tapered, round recess at one end, a pair of clamping members embracing a small portion of the edge and adjacent portions of the opposite flat faces of said panel and jointly formed to provide a round, tapered extension fitting into said recess, a screw stem extending outwardly from said support and through its recess and having threaded engagement with at least one of said clamping members to draw said tapered extension into said tapered recess.

4. A mirror, comprising a mirror panel, a support therefor having a tapered, round recess at one end, a pair of clamping members embracing a small portion of the edge and adjacent portions of the opposite flat faces of said panel and jointly formed to provide a round, tapered extension fitting into said recess, said clamping members also being jointly formed to provide an interior chamber, opposing lugs on said clamping members in said chamber, a screw stem extending outwardly from said support and through its recess and adapted to engage a threaded opening in the furthest lug to draw said lug against the companion lug and force the tapered extension into the tapered recess.

5. A mirror, comprising a mirror panel, a handle having a tapering recess at one end, a pair of clamping members embracing a small portion of the edge and adjacent portions of the opposite flat faces of said panel and jointly formed to provide a tapered extension fitting into said tapered recess, a T-slot extending transversely through said tapered extension, a bolt having its head anchored in said T-slot and a nut engaging the opposite threaded end of said bolt and seating against the outer end of said handle to draw said bolt lengthwise and said tapered extension into said tapered recess.

6. A mirror, comprising a mirror panel, a handle having a recess at one end, the outer part of said recess being of round, tapering form and the inner part being threaded and a pair of clamping members embracing a small portion of the edge and adjacent portions of the opposite flat faces of said panel and jointly formed to provide an extension, the outer part of which is threaded to fit the threaded part of said recess and the inner part of which is of round, tapering form to fit the tapered portion of said recess.

7. A mirror, comprising a mirror panel, a handle having a recess at one end, the outer part of said recess being of round, tapering form and the inner part being threaded, a pair of clamping members embracing a small portion of the edge and adjacent portions of the opposite flat faces of said panel and jointly formed to provide an extension, the outer part of which is threaded to fit the threaded part of said recess and the inner part of which is of round, tapering form to fit the tapered portion of said recess and transverse screw means connecting said clamping members.

8. A mirror, comprising a mirror panel, a handle having a recess at one end, the outer part of said recess being of round, tapering form and the inner part being threaded, a pair of clamping members embracing a small portion of the edge and adjacent portions of the opposite flat faces of said panel and jointly formed to provide an extension, the outer part of which is threaded to fit the threaded part of said recess and the inner part of which is of round, tapering form to fit the tapered portion of said recess and transverse screw means connecting said clamping members comprising a threaded bushing embraced by said clamping members and headed screws screwing into opposite ends of said bushing through openings provided in the sides of said clamping members.

WILLIAM LA HODNY.
ALFRED T. BARAGER.